(12) United States Patent
Park

(10) Patent No.: US 8,636,842 B2
(45) Date of Patent: Jan. 28, 2014

(54) ARTIFICIAL STONE AND MANUFACTURING METHOD THEREOF

(75) Inventor: Chang Hwan Park, Cheongju-si (KR)

(73) Assignee: LG Hausys, Ltd., Seoul (KR)

( * ) Notice: Subject to any disclaimer, the term of this patent is extended or adjusted under 35 U.S.C. 154(b) by 0 days.

(21) Appl. No.: 13/979,313

(22) PCT Filed: Jan. 11, 2012

(86) PCT No.: PCT/KR2012/000273
§ 371 (c)(1),
(2), (4) Date: Jul. 11, 2013

(87) PCT Pub. No.: WO2012/096511
PCT Pub. Date: Jul. 19, 2012

(65) Prior Publication Data
US 2013/0284072 A1   Oct. 31, 2013

(30) Foreign Application Priority Data
Jan. 13, 2011   (KR) .......................... 10-2011-0003410

(51) Int. Cl.
*C04B 14/06*   (2006.01)
*C04B 18/06*   (2006.01)
*B28B 1/087*   (2006.01)

(52) U.S. Cl.
USPC ........... 106/817; 106/811; 106/812; 106/816; 264/69; 264/101; 264/294; 264/328.1; 264/328.14; 264/333; 264/340; 264/645; 264/653

(58) Field of Classification Search
USPC ............ 106/811, 812, 816, 817; 264/69, 101, 264/294, 328.1, 328.14, 333, 340, 645, 653
See application file for complete search history.

(56) References Cited

U.S. PATENT DOCUMENTS

| | | | | |
|---|---|---|---|---|
| 5,681,639 A | * | 10/1997 | Minagawa et al. | 428/143 |
| 8,177,907 B2 | * | 5/2012 | Petersen | 106/716 |
| 8,475,890 B2 | * | 7/2013 | Jeong et al. | 428/15 |
| 2004/0138346 A1 | * | 7/2004 | Garrett et al. | 524/2 |
| 2010/0154676 A1 | * | 6/2010 | Park et al. | 106/286.5 |

FOREIGN PATENT DOCUMENTS

| | | | |
|---|---|---|---|
| EP | 0518777 A1 | * | 12/1992 |
| JP | 60103074 A | * | 6/1985 |
| JP | 2001-335355 | | 12/2001 |
| KR | 10-2008-0098973 | | 11/2008 |
| KR | 10-2010-0085881 | | 7/2010 |
| SU | 1760981 A3 | * | 9/1992 |
| WO | WO2010/071378 A2 | * | 6/2010 |

OTHER PUBLICATIONS

Derwent-Acc-No. 2011-Q13493, abstract of Russian Patent Specification No. RU 2435746 C2 (Dec. 2011).*
Derwent-Acc-No. 2012-B13067, abstract of Russian Patent Specification No. RU 2439020 C2 (Jan. 2012).*
Jo, et al. "An Experimental Study on Developing Ultra-High Strength Powder Concrete Using Low-Heat Portland Cement"; Journal of KSMI 2009, vol. 13 (6); pp. 135-147, ISSN 1226-6205.

* cited by examiner

*Primary Examiner* — Anthony J Green
(74) *Attorney, Agent, or Firm* — McKenna Long & Aldridge, LLP

(57) ABSTRACT

Disclosed is a method of manufacturing an artificial stone, and the method includes forming an artificial-stone paste which comprises 20-20 parts by weight of silica stone, metakaolim or silica fume, 200-300 parts by weight of quartz chips, 30-36 parts by weight if water, 1.5-3 part by weight of water-reducing agent and 0.2-3 parts by weight of pigment with response to 100 parts by weight of white cement; injecting the artificial-stone paste in a mold; primarily vacuum-molding the artificial-stone paste injected in the mold; secondarily vibration-molding the primarily molded artificial-stone paste; primarily curing the secondarily molded artificial-stone paste; secondarily curing the primarily cured artificial-stone paste, which induces a hydrothermal reaction and thus causes a pozzolanic reaction; releasing the secondarily cured artificial-stone paste from the mold; and surface-machining the released artificial-stone paste.

19 Claims, 2 Drawing Sheets

ARTIFICIAL STONE AND MANUFACTURING METHOD THEREOF

This application is a National Stage Entry of International Application No. PCT/KR2012/000273, filed Jan. 11, 2012, and claims the benefit of Korean Application No. 10-2011-0003410, filed on Jan. 13, 2011, which are hereby incorporated by reference in its entirety for all purposes as if fully set forth herein.

TECHNICAL FIELD

The present invention relates to an artificial stone, and particularly to an artificial stone using quartz and a manufacturing method thereof.

BACKGROUND ART

Artificial stone contrasted with natural stone means artificially manufactured stone. The artificial stone such as artificial marble and artificial granite is used as a structural exterior or interior material.

The most representative artificial stone is cementitious artificial stone. The cementitious artificial stone is manufactured with a low price and typically used as a structrual interior material.

FIG. 1 shows a process of manufacturing a conventional cementitious artificial stone. As shown in FIG. 1, the conventional cementitious artificial stone is manufactured through a step S11 of preparing artificial-stone paste including white cement or block cement, broken-stone chips, calcium carbonate or silica stone powder, water-reducing agent, pigment, water and the like, a step S12 of injecting the prepared artificial-stone paste in a mold, a vacuum molding step S13, a vacuum and vibration molding step S14, and a step S15 of steam-curing the molded artificial-stone paste. The cured artificial-stone paste is separated from the mold and then treated by polishing and surface machining. Thus, the artificial stone is completed.

The cementitious artificial stone contains ground granite stone or other broken-stone chip, or a small amount of mirror or glass chip in order to express its appearance. However, it is difficult to get out of terrazzo texture and thus to provide the appearance of exclusive engineering stone.

In order to provide the beautiful appearance of the cementitious artificial stone, it is necessary to use quartz. However, in case of using quartz, the quartz may be separated from the artificial stone due to its high strength. Further, if a particle size of the quartz is set to 4 mm or less in order to solve the quartz separation problem, a strength of the artificial stone is lowered, and fine cracks are formed in the artificial stone, and the quartz separation problem is not solved completely. As a result, it is impossible to use the quartz having a particle size of 2.5 mm or less in order to express the appearance of the cementitious artificial stone.

DISCLOSURE OF INVENTION

Technical Problem

An object of the present invention is to provide an artificial stone and a manufacturing method thereof, which improves cohesiveness between quartz chip having a particle size of 4 mm or less and other composition and thus prevents the quartz chip from being separated, and which enhances density of the artificial stone and also improves flexural rigidity and water absorption ratio, thereby improving the quality of the artificial stone.

Solution to Problem

To achieve the object of the present invention, the present invention provides an artificial-stone paste for manufacturing an artificial stone, which comprises 20~90 parts by weight of silica stone, metakaolin or silica fume, 200~300 parts by weight of quartz chips, 30~36 parts by weight of water, 1.5~3 parts by weight of water-reducing agent and 0.2~3 parts by weight of pigment with respect to 100 parts by weight of white cement.

Preferably, the quartz has a particle size of 0.3~4.0 mm, more preferably, 0.7~1.2 mm.

Preferably, a granite stone is partially contained in 200~300 parts by weight of the quartz chips.

Preferably, the water-reducing agent is a polycarboxylate water-reducing agent.

Further, the present invention provides a method of manufcturing an artificial stone, including forming an artificial-stone paste which comprises 20~90 parts by weight of silica stone, metakaolin or silica fume, 200~300 parts by weight of quartz chips, 30~36 parts by weight of water, 1.5~3 parts by weight of water-reducing agent and 0.2~3 parts by weight of pigment with respect to 100 parts by weight of white cement; injecting the artificial-stone paste in a mold; primarily vacuum-molding the artificial-stone paste injected in the mold; secondarily vibration-molding the primarily molded artificial-stone paste; primarily curing the secondarily molded artificial-stone paste; secondarily curing the primarily cured artificial-stone paste, which induces a hydrothermal reaction and thus causes a pozzolanic reaction; relasing the secondarily cured artificial-stone paste from the mold; and surface-machining the released tartiricial-stone paste.

Preferably, the primary curing is carried out at lower vacuum degree than 70 mmHg for about 50~60 seconds.

Preferably, the secondary curing is carried out at lower vacuum degree than 65 mmHg or less for about 1~4 minutes under a frequency of 2900~3100 cycles per a minute.

Preferably, the second curing is carried out for 5~10 hours at 6.0~10.0 bar and 150~180° C.

Preferably, the quartz has a particle size of 0.3~4.0 mm, more preferably, 0.7~1.2 mm.

Preferably, a granite stone is partially contained in 200~300 parts by weight of the quartz chips.

Further, the present invention provides an artificial stone which comprises quartz chips and tobermorite crystals.

Preferably, the quartz chips have a particle size of 0.3~4.0 mm.

Preferably, the tobermorite crystals are 1~20% of the total weight thereof.

Advantageous Effects of Invention

According to the paste composition for artificial stone and the manufacturing method thereof, even though using the quartz having a particle size of 4 mm or less, it is possible to improve the cohesiveness between quartz chip and other composition and thus to prevent the quartz chip from being separated. Further, since the quartz chips having a small particle size which can provide the beautiful appearance can be used as single broken-stone chips in manufacturing of the cementitious artificial stone, the artificial stone having the appearance of engineering stone can be manufactured with a low price. Furthermore, it is possible to enhance the density of the artificial stone and also improve the flexural rigidity and water absorption ratio, thereby improving the quality of the artificial stone.

BRIEF DESCRIPTION OF DRAWINGS

The above and other objects, features and advantages of the present invention will become apparent from the following description of preferred embodiments given in conjunction with the accompany drawings, in which.

BEST MODE FOR CARRYING OUT THE INVENTION

Hereinafter, the embodiments of the present invention will be described in detail.

Figure 1:
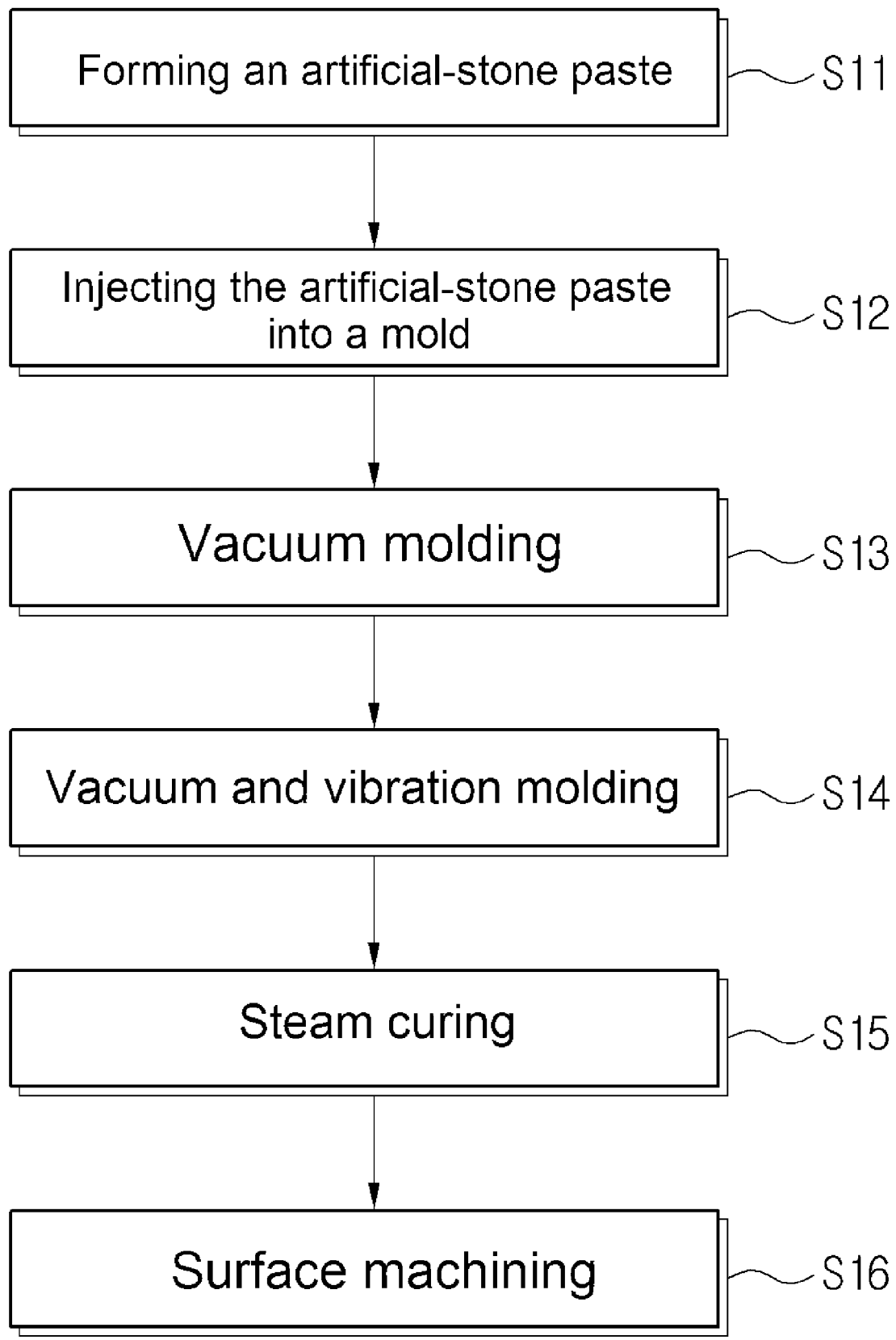
FIG. 1 is a flow chart showing a method of manufacturing a conventional cementitious artificial stone.
Figure 2:
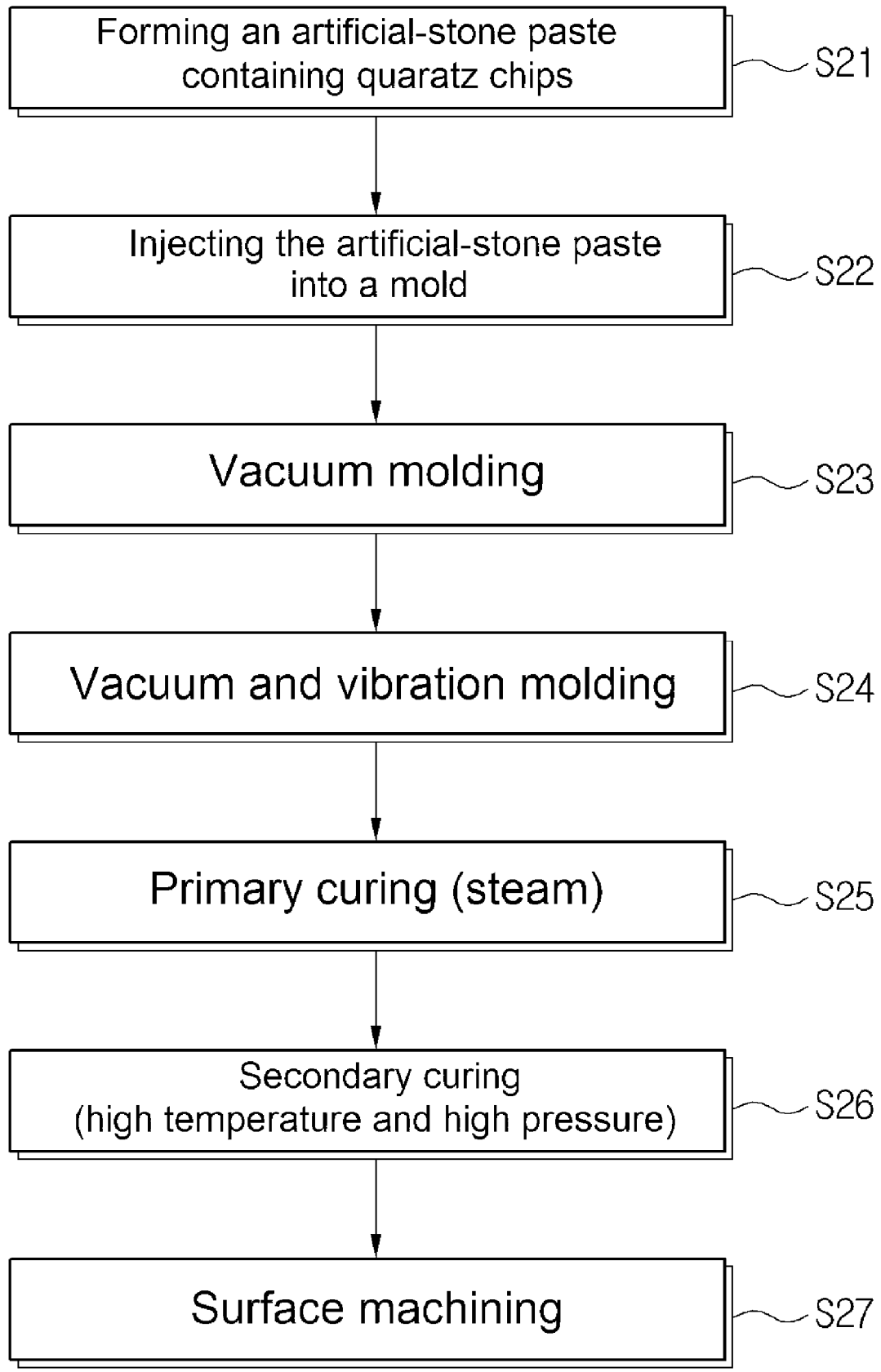
FIG. 2 is a flow chart showing a method of manufacturing an artificial stone according to the present invention.

FIG. 2 is a flow chart showing a method of manufacturing an artificial stone according to the present invention.

As shown in FIG. 2, a method of manufacturing an artificial stone according to the present invention includes a step S21 of preparing an artificial-stone paste.

The artificial-stone paste is composed of white cement, silica stone powder, quartz chip, water, water-reducing agent, pigment and the like. More detailedly, the artificial-stone paste includes 20~90 parts by weight of silica stone powder, 200~300 parts by weight of quartz chip, 30~36 parts by weight of water, 1.5~3 parts by weight of water-reducing agent and 0.2~3 parts by weight of pigment with respect to 100 parts by weight of white cement.

The white cement functions as a basic binder, and 100 parts by weight of white cement is added. If the content thereof is less than 100 parts by weight, the strength thereof is lowered after a hydration reaction of the cement. And if the content thereof is more than 100 parts by weight, the manufacturing cost is increased and also cement exudation is occurred by the excess cement.

The silica stone powder composed of $SiO_2$ functions to induce a pozzolanic reaction with cement when performing a high temperature and high pressure steam curing process and thus to tighten the cement. In other words, the silica stone powder performs the pozzolanic reaction with cement and thus forms a crystalloid material such as tobermorite or a semi-crystalloid material, thereby reducing porosity of the articile stone, increasing strength thereof and also providing watertightness. Further, when performing the high temperature and high pressure steam curing process using the silica stone powder, in some cases, a small amount of by-product like $Ca(OH)_2$ may be generated, but it can be also controlled to be not generated. Herein, the silica stone powder may be substituted with metakaolin, silica fume or the like. However, since the silica stone powder is inexpensive, it is preferable to use it.

The quartz chips used in the present invention have a particle size of 0.3~4.0 mm, preferably 0.7~1.2 mm. If necessary, the quartz chips may be used together with granite stone chips or general broken-stone chips.

The water-reducing agent functions to disperse cement particles by dispersion and wetting action in surface activity, thereby increasing workability. A polycarboxylate water-reducing agent is used in the present invention.

The pigment includes an organic pigment, an inorganic pigment, a pearl pigment, a holographic pigment and the like.

The artificial-stone paste prepared in the Step S21 is injected into a mold (S22). The mold functions to determine a shape of the artificial stone to be manufactured. A release material may be coated on an inner surface of the mold so as to easily separate the artificial stone after the curing.

The artificial-stone paste injected into the mold is treated by a primary molding process (S23). The primary molding is a high vacuum molding process in which the artificial-stone paste is molded at lower vacuum degree than 70 mmHg for about 50~60 seconds. Herein, the vacuum is applied in order to remove bubbles in the artificial-stone paste.

The primarily molded artificial-stone paste is treated by a secondary molding process (S24). The secondary molding is a vacuum and vibration molding process in which the artificial-stone paste is molded at a vacuum degree of 65 mmHg or less for about 1~4 minutes under a frequency of 2900~3100 cycles per a minute. When the vibration is applied, the bubbles included in the artificial-stone paste can be removed and also the chips having a large specific gravity are settled to a lower side of the mold, and thus an appearance rate of the quartz is increased. If the vibration is not applied, the appearance rate is about 50%, and if the vibration is applied, the appearance rate is increased to 90% or more.

The secondary molded artificial-stone paste is treated by a primary curing process (S25). The primary curing is a steam curing process in which the artificial-stone paste is cured so as to form an artificial stone. For example, the primary curing is performed at a temperature of about 60° C. and a relative humidity of 65% or more for 12~35 hours.

The primarily cured artificial-stone paste is treated by a secondary curing process (S26). The secondary curing is a high temperature and high pressure steam curing process which is carried out in an autoclave for 5~10 hours at 6.0~10.0 bar and 150~180° C. and in which a hydrothermal reaction is induced to the artificial-stone paste so as to occur the pozzolanic reaction. In induction of the pozzolanic reaction, a reactant and water are injected into an airtight container, and the water is heated and vaporized at the boiling point so that the airtight container is in a high pressure state, thereby rapidly causing a desirable reaction of the artificial stone. In the pozzolanic reaction, the silica stone powder is reacted with calcium hydroxide generated when white cement is hydrated and thus an insoluble compound is formed. However, it is possible to prevent the generation of calcium hydroxide during the pozzoliznic reaction.

The secondarily cured artificial-stone paste is released from the mold (S26), and an artificial stone having a desired shape is formed.

The released artificial stone is treated by treated by polishing and surface machining (S27), and thus an artificial stone product is completed.

Particularly, in the present invention, the artificial-stone paste is treated by the secondary curing process, i.e., the high temperature and high pressure steam curing process. By such the process, the flexural rigidity of the artificial stone is improved and the water absorption ratio is lowered. Hereinafter, the cases which have the secondary curing process or not are compared with each other.

Embodiment

The artificial-stone paste is composed of 100 parts by weight of white cement, 60 parts by weight of silica stone powder, 220 parts by weight of quartz chip (having a particle size of 0.7~1.2), 34 parts by weight of water, 2.0 parts by weight of (polycarboxylate) water-reducing agent and 1.5 parts by weight of inorganic pigment. The artificial-stone paste is injected into a mold and treated by the primary vacuum molding (70 mmHg, about 55 seconds) and the secondary vibration and vacuum molding (65 mmHg, 3000 rpm and about 110 seconds), thereby forming a molded body.

The molded body is treated by the first steam curing (60° C., a relative humidity of 98% and 12 hours) and then treated by the secondary high temperature and high pressure steam curing (6.5 bar, 160° C. and 5 hours) using the autoclave, thereby inducing the hydrothermal reaction.

The cured artificial stone is treated by the back side machining, surface machining, surface gloss and the like, and thus the cementitious artificial stone having particulate quartz is completed.

Comparative Example

The artificial-stone paste is composed of 100 parts by weight of white cement, 60 parts by weight of silica stone powder, 220 parts by weight of quartz chip (having a particle size of 0.7~1.2), 34 parts by weight of water, 2.0 parts by weight of (polycarboxylate) water-reducing agent and 1.5 parts by weight of inorganic pigment. The artificial-stone paste is injected into a mold and treated by the primary vacuum molding (70 mmHg, about 55 seconds) and the secondary vibration and vacuum molding (65 mmHg, 3000 rpm and about 110 seconds), thereby forming a molded body.

The molded body is treated by the first steam curing (60° C., a relative humidity of 98% and 12 hours) and then released from the mold. After that, the cured artificial stone is treated by the back side machining, surface machining, surface gloss and the like, and thus the cementitious artificial stone having particulate quartz is completed.

Measurement and Estimation of Physical Properties

The flexural rigidity and the water absorption rate of the artificial stone manufactured according to the embodiment and the comparative example are meaured. The measured results are as follows:

Table 1

TABLE 1

|  | flexural rigidity (Mpa) | water absorption rate (%) |
|---|---|---|
| Embodyment | 22 | 1.8 |
| Comparative example | 11 | 3.3 |

In the table 1, it can be understood that the artificial stone manufactured through the high temperature and high pressure steam curing process using the silica stone powder has the improved flexural rigidity and the low water absorption rate. Further, the artificial stone treated by the high temperature and high pressure steam curing process has the enhanced density.

The artificial stone manufactured as described above includes the quartz chips and tobermorite crystals. The quartz chips contained in the artificial stone may have a particle size of 0.3~4.0 mm. Further, it is preferable that the tobermorite crystals contained in the artificial stone are 1-20% of the total weight thereof.

INDUSTRIAL APPLICABILITY

As described above, even though using the quartz having a particle size of 4 mm or less, it is possible to improve the cohesiveness between quartz chip and other composition and thus to prevent the quartz chip from being separated. Further, since the quartz chips having a small particle size which can provide the beautiful appearance can be used as single broken-stone chips in manufacturing of the cementitious artificial stone, the artificial stone having the appearance of engineering stone can be manufactured with a low price. Furthermore, it is possible to enhance the density of the artificial stone and also improve the flexural rigidity and water absorption ratio, thereby improving the quality of the artificial stone.

While the present invention has been described with respect to the specific embodiments, it will be apparent to those skilled in the art that various changes and modifications may be made without departing from the spirit and scope of the invention as defined in the following claims.

The invention claimed is:

1. An artificial-stone paste for manufacturing an artificial stone, which comprises 20~90 parts by weight of silica stone, metakaolin or silica fume, 200~300 parts by weight of quartz chips, 30~36 parts by weight of water, 1.5~3 parts by weight of water-reducing agent and 0.2~3 parts by weight of pigment with respect to 100 parts by weight of white cement.

2. The artificial-stone paste according to claim 1, wherein the quartz has a particle size of 0.3~4.0 mm.

3. The artificial-stone paste according to claim 1, wherein the quartz has a particle size of 0.7~1.2 mm.

4. The artificial-stone paste according to claim 1, wherein a granite stone is partially contained in 200~300 parts by weight of the quartz chips.

5. The artificial-stone paste according to claim 2, wherein a granite stone is partially contained in 200~300 parts by weight of the quartz chips.

6. The artificial-stone paste according to claim 3, wherein a granite stone is partially contained in 200~300 parts by weight of the quartz chips.

7. A method of manufacturing an artificial stone, comprising: forming an artificial-stone paste which comprises 20~90 parts by weight of silica stone, metakaolin or silica fume, 200~300 parts by weight of quartz chips, 30~36 parts by weight of water, 1.5~3 parts by weight of water-reducing agent and 0.2~3 parts by weight of pigment with respect to 100 parts by weight of white cement; injecting the artificial-stone paste in a mold; primarily vacuum-molding the artificial-stone paste injected in the mold; secondarily vibration and vacuum molding the primarily molded artificial-stone paste; primarily curing the secondarily molded artificial-stone paste; secondarily curing the primarily cured artificial-stone paste, which induces a hydrothermal reaction and thus causes a pozzolanic reaction; releasing the secondarily cured artificial-stone paste from the mold; and surface-machining the released artificial-stone paste.

8. The method according to claim 7, wherein the primary curing is carried out at lower vacuum degree than 70 mmHg for 50~60 seconds.

9. The method according to claim 7, wherein the secondary curing is carried out at lower vacuum degree than 65 mmHg or less for about 1~4 minutes under a frequency of 2900~3100 cycles per a minute.

10. The method according to claim 7, wherein the second curing is carried out for 5~10 hours at 6.0~10.0 bar and 150~180° C.

11. The method according to claim 7, wherein the quartz has a particle size of 0.3~4.0 mm.

12. The method according to claim 11, wherein the quartz has a particle size of 0.7~1.2 mm.

13. The method according to claim 7, wherein a granite stone is partially contained in 200~300 parts by weight of the quartz chips.

14. The method according to claim 8, wherein the quartz has a particle size of 0.3-4.0 mm.

15. The method according to claim 9, wherein the quartz has a particle size of 0.3-4.0 mm.

16. The method according to claim 10, wherein the quartz has a particle size of 0.3-4.0 mm.

17. The method according to claim 8, wherein a granite stone is partially contained in 200-300 parts by weight of the quartz chips.

18. The method according to claim 9, wherein a granite stone is partially contained in 200-300 parts by weight of the quartz chips.

19. The method according to claim 10, wherein a granite stone is partially contained in 200-300 parts by weight of the quartz chips.

\* \* \* \* \*